United States Patent
Lin et al.

(10) Patent No.: US 10,798,642 B2
(45) Date of Patent: Oct. 6, 2020

(54) ON-DEMAND SYSTEM INFORMATION DELIVERY PROCEDURE

(71) Applicant: MEDIATEK INC., Hsinchu (TW)

(72) Inventors: Guan-Yu Lin, Hsinchu (TW); Chia-Chun Hsu, Hsinchu (TW); Per Johan Mikael Johansson, Kungsangen (SE)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 15/862,591

(22) Filed: Jan. 4, 2018

(65) Prior Publication Data

US 2018/0199267 A1 Jul. 12, 2018

Related U.S. Application Data

(60) Provisional application No. 62/443,014, filed on Jan. 6, 2017, provisional application No. 62/443,015, filed on Jan. 6, 2017.

(51) Int. Cl.
*H04W 48/10* (2009.01)
*H04W 48/14* (2009.01)
(Continued)

(52) U.S. Cl.
CPC .......... *H04W 48/10* (2013.01); *H04L 12/189* (2013.01); *H04W 48/14* (2013.01); *H04W 72/14* (2013.01);
(Continued)

(58) Field of Classification Search
CPC ..... H04W 48/10; H04W 48/14; H04W 72/14; H04L 12/189
See application file for complete search history.

(56) References Cited

U.S. PATENT DOCUMENTS

| 2010/0103854 A1 | 4/2010 | Lee et al. ..................... 370/312 |
| 2013/0242730 A1 | 9/2013 | Pelletier et al. .............. 370/230 |

(Continued)

FOREIGN PATENT DOCUMENTS

| CN | 101601208 A | 1/2007 |
| CN | 101640842 A | 2/2010 |

(Continued)

OTHER PUBLICATIONS

U.S. Appl. No. 62/433,711 (Year: 2016).*
(Continued)

*Primary Examiner* — Jay L Vogel
(74) *Attorney, Agent, or Firm* — Imperium Patent Works; Zheng Jin

(57) ABSTRACT

Apparatus and methods are provided for on-demand system information (SI) delivery. In one novel aspect, an indicator in the minimum system information (MSI) indicates whether an SI or an SI group is delivered with broadcast or unicast. In one embodiment, the UE receives a MSI, obtains from the MSI the other SI (OSI) delivery mode indicator, and sends an on-demand SI request if the OSI delivery mode indicates the unicast delivery mode, otherwise acquires OSI information in a predefined or scheduled period if the OSI delivery mode indicates the broadcast delivery mode. In one embodiment, the delivery mode is unicast and the SI request is sent at a timing or resource explicitly configured in a SI change notification message. In another embodiment, the delivery mode is broadcast and updated SI is obtained based on the scheduling information included in the SI change notification message.

19 Claims, 7 Drawing Sheets

(51) Int. Cl.
*H04L 12/18* (2006.01)
*H04W 72/14* (2009.01)
*H04W 48/12* (2009.01)

(52) U.S. Cl.
CPC ............. *H04W 48/12* (2013.01); *Y02D 70/00* (2018.01); *Y02D 70/1262* (2018.01); *Y02D 70/24* (2018.01); *Y02D 70/25* (2018.01)

(56) References Cited

U.S. PATENT DOCUMENTS

| | | | |
|---|---|---|---|
| 2016/0205660 | A1 | 7/2016 | Ryu et al. ................ 455/458 |
| 2016/0234759 | A1 | 8/2016 | Kubota et al. ............ 370/254 |
| 2016/0270013 | A1* | 9/2016 | Soriaga ............ H04W 56/0015 |
| 2017/0311285 | A1* | 10/2017 | Ly ................... H04W 74/0833 |
| 2018/0132168 | A1* | 5/2018 | Ingale ................. H04W 48/12 |
| 2018/0167918 | A1* | 6/2018 | Ishii .................. H04W 72/042 |
| 2018/0310228 | A1* | 10/2018 | Rune ................... H04W 48/10 |
| 2019/0141746 | A1 | 5/2019 | Hong et al. |
| 2019/0174554 | A1* | 6/2019 | Deenoo ............... H04W 80/02 |

FOREIGN PATENT DOCUMENTS

| | | |
|---|---|---|
| CN | 101932139 A | 12/2010 |
| CN | 103813271 A | 11/2012 |
| CN | 103813271 A | 5/2014 |
| CN | 106171011 A | 11/2016 |
| TW | 201630446 A | 8/2016 |
| WO | WO2016130353 A3 | 2/2015 |
| WO | WO2016198909 A1 | 12/2016 |

OTHER PUBLICATIONS

Deenoo, U.S. Appl. No. 62/442,317, filed Jan. 4, 2017 (Year: 2017).*

International Search Report and Written Opinion of International Search Authority for PCT/CN2018/071586 dated Mar. 28, 2018 (9 pages).
Taiwan IPO, search report for the TW patent application 107100484 (no English translation is available) dated Jan. 23, 2019 (8 pages).
Taiwan IPO, search report for the TW patent application 107100484 (no English translation is available) dated Sep. 4, 2019 (11 pages).
R2-167074 3GPP TSG-RAN WG2 Meeting #95bis, CMCC, "Further considerations on minimum SI", Kaohsiung, Taiwan, Oct. 10-14, 2016 (4 pages).
R2-166573 3GPP TSG-RAN2 #95bis Meeting, MediaTek Inc., "On-demand SI delivery", Kaohsiung, Taiwan, Oct. 10-14, 2016 (4 pages).
Sipo, search report for the CN patent application 201880000160.2 (no English translation is available) dated May 29, 2020 (16 pages).
R2-167580 3GPP TSG-RAN2 Meeting #96, Huawei et al., Further Considerations of "Other SI", Reno, Nevada, USA, Nov. 14-18, 2016 (6 pages).
R2-168464 3GPP TSGH-RAN WG2 #95, InterDigital Communications, Acquisition of Other-SI, Reno, Navada, Usa, Nov. 14-18, 2016 (4 pages).
R2-1700011 3GPP TSG-RAN WG2 NR, Samsung, on Demand SI Delivery: Signaling Aspects, Spokane, USA, Jan. 17-19, 2017 (5 pages).
R2-166706 3GPP TSG-RAN WG2 Meeting #95, ETRI, On-demand SI delivery mechanism, Kaohsiung, Taiwan, Oct. 10-14, 2016 (3 pages).
R2-1700045 3GPP Tsg-RAN2 NR Ad Hoc, OPPO, Discussion on Remaining Issues of Other SI Design, Spokane, USA, Jan. 17-19, 2017 (4 pages).
R2-166353 3GPP TSG RAN WG2 Meeting #95bis, Sharp, NR System Information Areas for Other SI, Kaohsiung, Taiwan, Oct. 10-14, 2016 (4 pages).

* cited by examiner

ON-DEMAND SYSTEM INFORMATION DELIVERY PROCEDURE

CROSS REFERENCE TO RELATED APPLICATIONS

This application claims priority under 35 U.S.C. § 119 from U.S. Provisional Application No. 62/443,014 entitled "Enhanced Broadcast Scheme for On-demand System Information Delivery" filed on Jan. 6, 2017, and U.S. Provisional Application No. 62/443,015, entitled "On-demand SI Unicast Procedure for System Information Delivery", filed on Jan. 6, 2017, the subject matters of which are incorporated herein by reference.

TECHNICAL FIELD

The disclosed embodiments relate generally to wireless communication, and, more particularly, to on-demand system information delivery.

BACKGROUND

In the legacy Long Term Evolution (LTE) mobile telecommunication systems procedure for system information (SI) change notification and system information broadcast schemes have been well designed for use equipment (UE) to be informed of system information change and update UE stored system information. However, in the 5G system information is classified into two categories, the minimum SI (MSI) and other SI (OSI). The former is the most essential system information, such as the system information related to cell access, while the latter is the SI which is not included in minimum SI. Some of OSI may be periodically broadcasted the same way as in the LTE, and some of OSI may be delivered on demand, which is called the on-demand OSI. The on-demand OSI is not periodically broadcasted by the 5G base station called the gNB. Instead, the gNB provides on-demand SI when required. The gNB could proactively provide on-demand SI for some UEs in need. When a new UE enters a cell, the gNB provides the new UE with the updated system information in the cell for UEs to run its interested services. In addition to the proactive on-demand SI delivery, the gNB could reactively transmit on-demand SI when the gNB detects UEs' request on certain on-demand OSI.

The objective to have on-demand SI delivery is to enhance legacy approach to SI delivery. In the legacy LTE, system information is always broadcasted periodically. Periodically broadcasted system information causes periodic inter-cell interference, and thus limits the density of cell deployment. In addition, periodic broadcast reduces radio resource utilization since the gNB always broadcasts all system information even if there is no UE in the cell or even if some system information is not needed by any UE in the cell. Furthermore, periodically broadcasted system information is not good to discontinuous transmission (DTX) since the gNB always needs to do periodic broadcast. It is, therefore, desired to deliver on-demand OSI only when they are needed by some UEs to reduce unnecessary SI transmission.

Improvements and enhancements are required for on-demand system information delivery.

SUMMARY

Apparatus and methods are provided for on-demand system information (SI) delivery. In one novel aspect, an indicator in the minimum system information (MSI) indicates whether an SI or an SI group is delivered with broadcast or unicast. In one embodiment, the UE receives a MSI, obtains from the MSI the other SI (OSI) delivery mode indicator, which indicates a broadcast delivery mode or an on-demand unicast delivery mode, and sends an on-demand SI request if the OSI delivery mode indicates the unicast delivery mode, otherwise acquires OSI information in a predefined or scheduled period if the OSI delivery mode indicates the broadcast delivery mode. In one embodiment, the delivery mode is unicast and the SI request is sent after the start of the next SI modification period as configured or at a timing or resource explicitly configured in a SI change notification message. In another embodiment, the delivery mode is broadcast and updated SI is obtained in either the start of the next modification period or based on the scheduling information included in the SI change notification message.

In another novel aspect, the one or more SI-specific information is sent to the UE in either the MSI or the SI change notification messages. In one embodiment, the SI change notification carries one or more SI acquisition information including the SI window information for the UE to monitor possible SI transmission before it starts on-demand SI request. The SI window information includes one or more elements including which SI is broadcasted in the SI window, the start of the time window of the SI transmission, the window length, and the RNTI sued to send the SI in the window, such as RA-RNTI or SI-RNTI.

In yet another novel aspect, the enhanced on-demand unicast procedure is provided. In one embodiment, the UE uses a SI-specific preamble in the Msg1 to indicate the SI request to the base station. The base station replies the SI response in Msg2. In one embodiment, the SI response is broadcasted or multi-casted to one or more other UEs. In yet another embodiment, the SI request is sent along in the Msg1 with the regular preamble. If the gNB failed to decodes the SI request, the UE falls back to the four-step SI request procedure by sending the SI request in Msg3. In one embodiment, a reserved preamble is used in Msg1 to indicate the SI request without specifying which one or more SIs are requested. The base station sends SI response with a selected group so SIs based on one or more conditions including the SIs being recently updated, different form the neighboring cell, and frequently requested at that moment.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
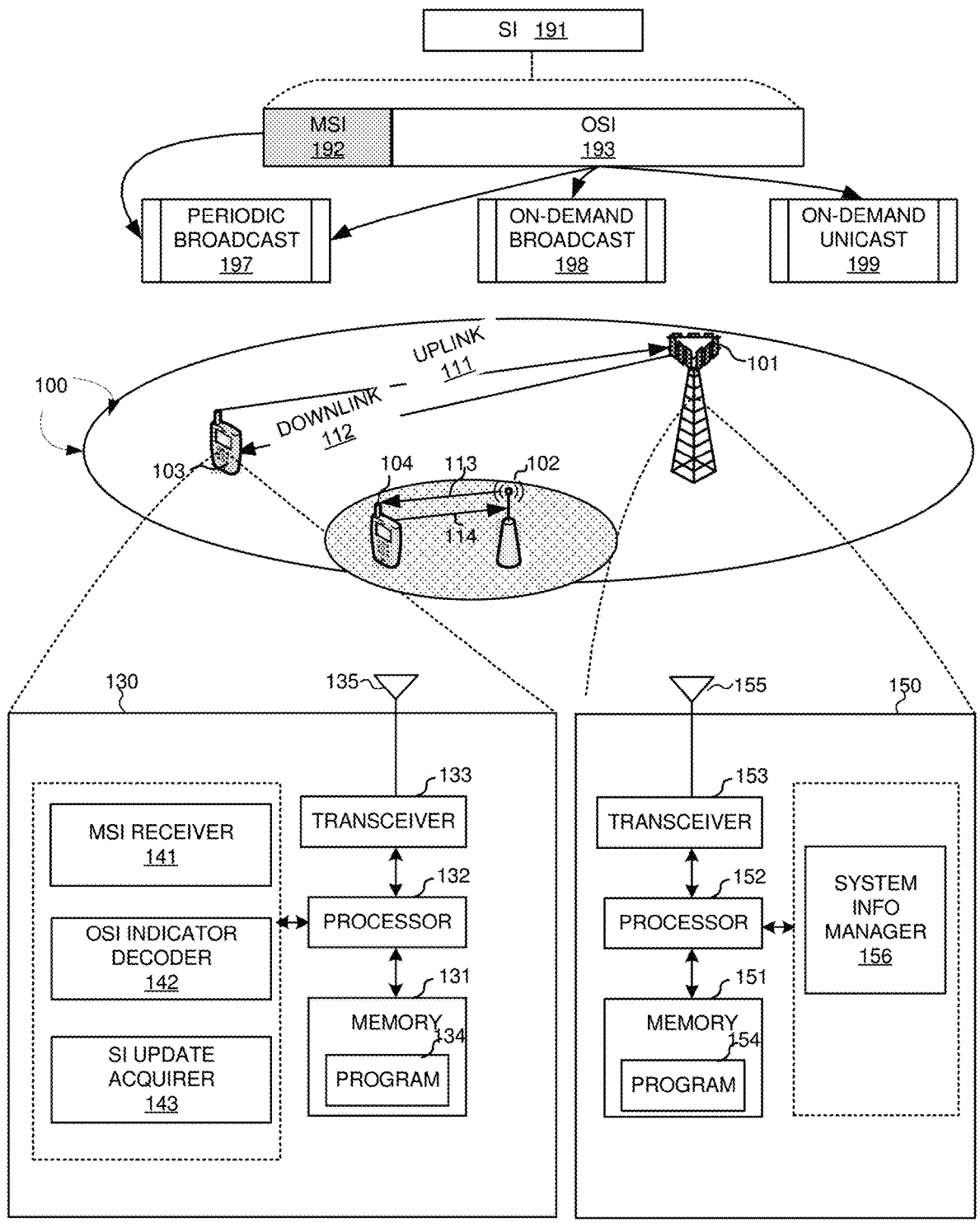
FIG. 1 is a schematic system diagram illustrating an exemplary on-demand SI delivery in accordance with embodiments of the current invention.

FIG. 1 is a schematic system diagram illustrating an exemplary on-demand SI delivery in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. In FIG. 1, the one or more base stations 101 and 102 serve several remote units/user equipment (UEs) 103 and 104 within a serving area, for example, a cell, or within a cell sector. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to UEs or mobile stations in the time and/or frequency domain. UEs or mobile stations 103 and 104 communicate with one or more base stations 101 and 102 via uplink communication signals 111 and 114. UE or the mobile station may also be referred to as a mobile phone, laptop, and mobile workstation and so on. In FIG. 1, the wireless communication system 100 is an OFDM/OFDMA system comprising a base station gNB 101 gNB 102 and a plurality of UE 103 and UE 104. When there is a downlink packet to be sent from the gNB to the UE, each UE gets a downlink assignment, e.g., a set of radio resources in a physical downlink shared channel (PDSCH). When a UE needs to send a packet to gNB in the uplink, the UE gets a grant from the gNB that assigns a physical uplink shared channel (PUSCH) consisting of a set of uplink radio resources. In LTE, system information is updated on a per modification period basis. The system information broadcasted in the same modification period is the same. When the network changes one or more system information, it first notifies the UEs about this change. The notification may be done throughout a modification period. The UE expects to receive the updated system information in the start of the next modification period. In the 5G network, on-demand SI are supported.

FIG. 1 further illustrates simplified block diagrams 130 and 150 for UE 103 and gNB 101, respectively. UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in UE 103. Memory 131 stores program instructions and data 134 to control the operations of UE 103.

UE 103 also includes multiple function modules that carry out different tasks in accordance with embodiments of the current invention. An MSI receiver 141 receives a MSI from a base station. An OSI indicator decoder 142 obtains an OSI delivery mode indicator from the MSI, wherein the OSI delivery mode indicating either a broadcast delivery mode or an unicast delivery mode for the OSI, and wherein the broadcast mode includes a periodic broadcast mode and an on-demand broadcast mode. An SI update acquirer 143 sends an on-demand SI request if the OSI delivery mode indicates the unicast delivery mode, otherwise acquires OSI information in a predefined or scheduled period if the OSI delivery mode indicates the broadcast delivery mode.

Also shown in FIG. 1 is exemplary block diagram for gNB 101. gNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in gNB 101. Memory 151 stores program instructions and data 154 to control the operations of gNB 101. gNB 101 also includes function modules that carry out different tasks in accordance with embodiments of the current invention. A system information manager 156 performs functions to support on-demand system information delivery functions.

System Information Delivery Method Indication

In one novel aspect, the delivery method of the SI is indicated to the UE either in the MSI or in the SI change notification. The UE obtains SI based on the delivery method indicated in the MSI or the SI change notification message. In one embodiment, an indicator is included in the MSI to indicate whether the SI is delivered by broadcast or unicast. The broadcast delivery can be either a periodical broadcast or an on-demand broadcast. If the UE detects that the one or more SI is delivered by unicast, the UE sends SI request for the SI. Otherwise, if the UE detects that the SI is delivered by broadcast, it will look for the broadcast window to acquire the SI update.

FIG. 1 illustrates a system information delivery scheme. SI 191 includes a MSI 192 and one or more OSI 193. There are three types of SI delivery method, the periodic broadcast 197, on-demand broadcast 198 and on-demand unicast 199. In the 5G network, MSI 192 are delivered by periodic broadcast. Some of OSI are configured to be delivered using periodic broadcast, some of the OSI are configured to be delivered using on-demand broadcast, and some of the OSI are configured to be delivered using on-demand unicast.

If UEs is informed by SI change notification about the change of an interesting OSI, UE may want to trigger on-demand SI request. However, before UE sends on-demand SI request, UE needs to know what radio resource is available for on-demand SI request. To enable dynamic radio resource configuration for SI request, we propose to put the information of SI request resource in the SI change modification. For example, if SI request resource is present in SI change notification, UE can use this resource to request for on-demand SI if the SI is the interesting/required OSI to the UE. Otherwise, UE is not allowed to send SI request proactively, and has to wait for the scheduled SI request resource indicated in SI change notification, or wait until the start of the next modification period. When UE wants to update SI, UE should know how the desired SI is delivered, e.g. through broadcast or on-demand unicast. Network could indicates this in minimum SI or in SI change notification. In paging message, system information change notification could bring a bit for each changed SI/SI group to indicate that whether the changed SI/SI group is already scheduled for transmission, e.g. in the start of the next modification period. If the bit is 1, UEs who need the update on-demand SI/SI group should not trigger any on-demand SI request because the desired SI has been requested and scheduled; otherwise, UE is allowed to send on-demand SI request to trigger SI transmission.

Except for the scheduled/unscheduled bit in paging message, system information change notification could instead bring a bit for each changed SI/SI group to indicate that whether the changed SI/SI group is delivered through broadcast or unicast. If the deliver method is broadcast, UEs who need the updated on-demand SI/SI group should not trigger any on-demand SI request because the desired SI has been requested and scheduled. In this case UE can acquire the updated system information in the start of the next modification period, or can acquire the updated OSI according to the additional scheduling information if provided in the same system information change notification. In contrast, if the deliver method is unicast, UE is allowed to send on-demand SI request. Note that the timing or resource to send the SI request could be explicitly configured in the same SI change notification as we mentioned before, or send SI request after the start of the next modification period. To avoid UL congestion after SI update, the base station could schedule broadcast for the changed on-demand SI in the start of the next modification period after the modification period of broadcasting SI change notification. Since the SI broadcast is triggered by events such as SI update, we call it on-demand broadcast. The scheduling information of the on-demand broadcast could be distributed in the minimum SI at the start of the modification period for updated SI broadcasting, so that UE know that the updated SI is delivered through broadcast, and will not send SI requests. In addition, on-demand broadcast could be scheduled for once, for several times, or for a period of time, to ensure that UL congestion due to surging SI requests for SI update has been eliminated.

SI-Specific Update Procedure

In another novel aspect, to address the problem of redundant SI acquisition, the system information modification procedure is performed to enable the UEs to know which OSI has an updated version. If the updated SI is not interesting to the UE, the UE will not perform the SI update procedure. In one embodiment, SI-specific systemInfoValueTag and SI-specific systemInfoModification is used. In another embodiment, SI-specific systemInfoValueTag and SI-specific systemInfoModification could also be group based, i.e. several SIs shares the same systemInfoValueTag/systemInfoModification. That is, if any one of the SIs in the group is updated, the systemInfoValueTag/systemInfoModification associated with the group is changed/indicated. The scheduling information of the changed/updated OSI is indicated in the SI change notification of the paging message. The scheduling information enables the UE to acquire the desired OSI at the scheduled time to save power for the UE. In one embodiment, the OSI update is predefined. The predefined window can be the modification period (MP) after the MP of the SI change notification. In another embodiment, the SI update scheduling information is included in the SI Change Notification, which enables the OSI update to be within the same MP as the SI Change Notification MP or in other MPs as desired. The scheduling information included in SI change notification could be an explicit indication of the timing and length of the time window for SI transmission, e.g. the time window of the changed OSI starts in X TTI (transmission time interval), X milliseconds, or X PDCCH monitoring occasions after UE receives the SI change notification, and the time window lasts for Y TTI, Y milliseconds, or Y PDCCH monitoring occasions. Also, the scheduling information could indicate the RNTI (radio network temporary identifier) UE use to decode the SI in the SI transmission window. In addition to explicit indication, scheduling information could also be predefined/configured, e.g. the SI acquisition information for the dynamic SI broadcast could be pre-configured and broadcasted in minimum SI. Then in SI change notification we need only one or a few bits to indicate the existence of dynamically scheduled SI transmission window. If UE receives the SI change notification, UE acquires the updated OSI according to the predefined SI acquisition information. In one embodiment, the SI acquisition information is broadcasted in the MSI. If UE finds SI-specific systemInfoValueTag/systemInfoModification but does not find corresponding scheduling information, UE could follow legacy SI acquisition procedure as specified in LTE. The following diagrams illustrate exemplary schemes for SI update procedures.

Figure 2A:
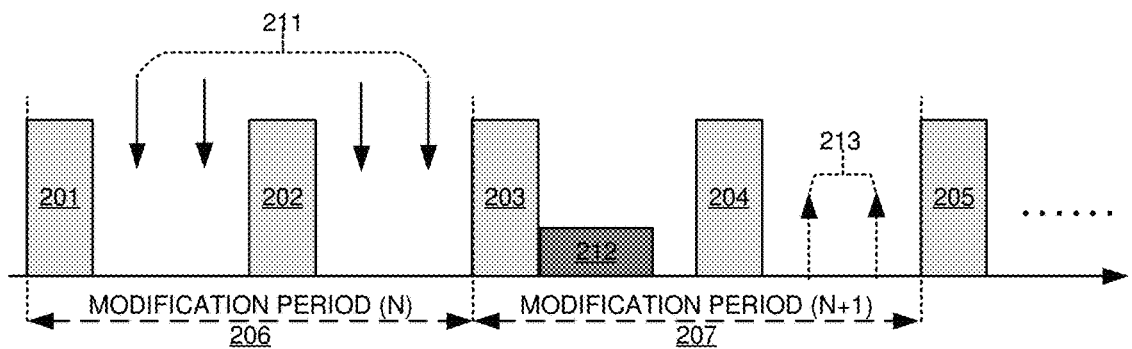
FIG. 2A illustrates an exemplary SI delivery diagram of having one SI window to broadcast the updated on-demand SI in accordance with embodiments of the current invention.
Figure 2B:
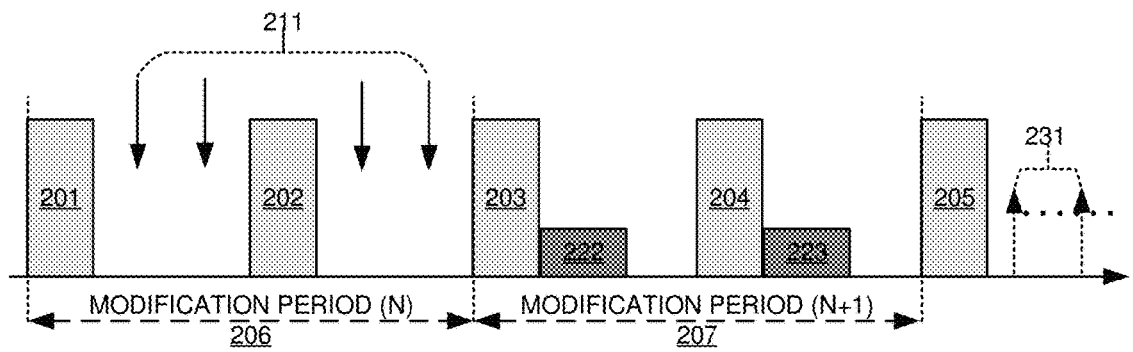
FIG. 2B illustrates an exemplary SI delivery diagram of several SI windows to broadcast the updated on-demand SI in accordance with embodiments of the current invention.

FIGS. 2A and 2B illustrate the on-demand broadcast scheme to eliminate UL congestion due to surging SI request after SI update. To reduce possible UL congestion causing by the SI update, the gNB could configure one or more SI broadcast window to broadcast the updated SI at the start of modification period for SI update. In one embodiment, the scheduling information of the updated OSI is indicated in the schedulingInfoList of SIB1/minimum SI. Since most UEs update the OSI in the start of the modification period, the gNB needs to configure only one or several SI windows to broadcast the OSI in the start of the modification period. After several times of SI broadcast, the delivered mode of the changed SI could be turned back to on-demand unicast mode. The gNB does not periodically broadcast the OSI. FIG. 2A and FIG. 2B show the scenario of broadcasting the changed SI after the start of modification period for once and for several times.

FIG. 2A illustrates an exemplary SI delivery diagram of having one SI window to broadcast the updated on-demand SI in accordance with embodiments of the current invention. The MSI 201, 202, 203, 204, and 205 are periodically broadcasted. At modification period N 206, the network sends SI Change Notification. In one embodiment, the SI Change Notification notifies changes of one or more specific OSI-X. In one embodiment, the updated OSI-X is broadcasted with the legacy broadcast scheme in the start of modification period N+1 207 at broadcast window 212. In one embodiment, during the modification period 207, the UE is configured to send SI Request 213 for one or more OSIs that is no longer broadcasted. The UE that needs SI update should trigger the on-demand SI delivery procedure.

FIG. 2B illustrates an exemplary SI delivery diagram of several SI windows to broadcast the updated on-demand SI in accordance with embodiments of the current invention. The MSI 201, 202, 203, 204, and 205 are periodically broadcasted. At modification period N 206, the network sends SI Change Notification. In one embodiment, the SI Change Notification notifies changes of one or more specific OSI-X. In one embodiment, the network proactively broadcast OSI-X with legacy broadcast scheme at modification period N+1 207. In another embodiment, the proactively one-demand SI broadcast is sent several times in windows 222 and 223 after the MSI periodic broadcast 203 and 204, respectively. Broadcasting the OSI several times eliminates surging SI requests and enables the UE get the updated OSI at the predefined broadcast windows. In one embodiment, after the modification period 207, the UE is configured to send SI Request 231 for one or more OSIs that is no longer broadcasted. The UE that needs SI update should trigger the on-demand SI delivery procedure.

Figure 3A:
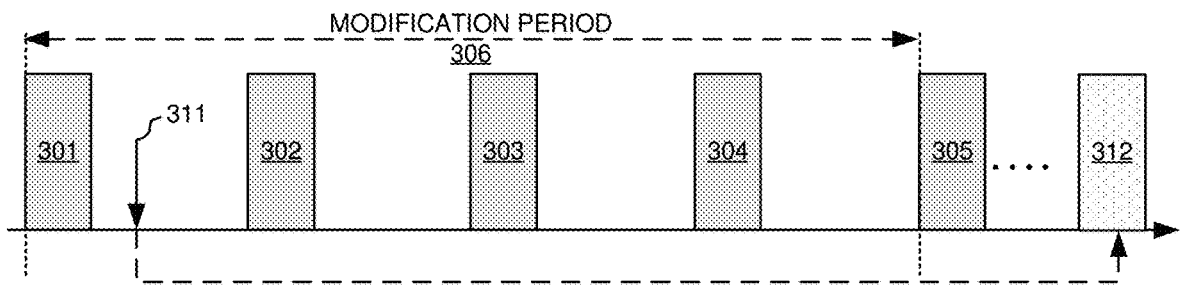
FIG. 3A illustrates an exemplary diagram of the time-wise SI delivery procedure for periodically broadcasted OSI in accordance with embodiments of the current invention.

FIG. 3A illustrates an exemplary diagram of the time-wise SI delivery procedure for periodically broadcasted OSI in accordance with embodiments of the current invention. In a modification period 306, MSI 301, 302, 303, and 304 are periodically broadcasted. MSI 305 is broadcasted in the next MP after MP 306. During MP 306, SI change notification 311 is sent. In paging message, the SI change notification indicates the updated OSI, and provide scheduling information for the UE to acquire the updated OSI. In one embodiment, the scheduling information indicates the updated OSI is broadcasted in a specified window 312 at the start of the next modification period. Then, UE does not need to re-acquire minimum SI before re-acquiring the updated OSI.

Figure 3B:
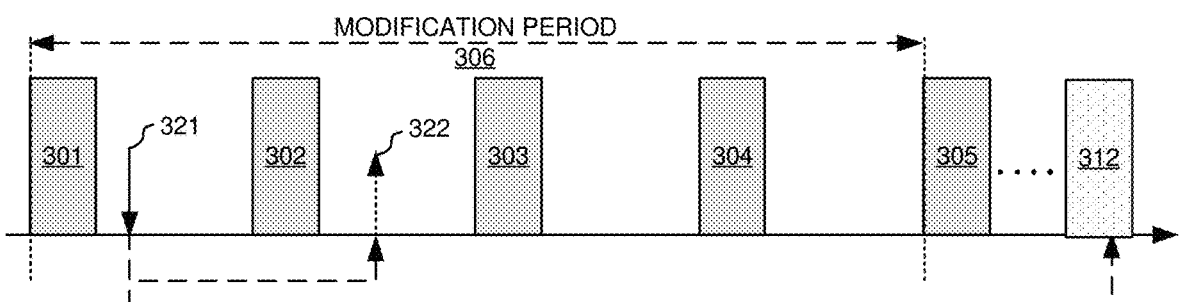
FIG. 3B illustrates an exemplary diagram of the time-wise SI delivery procedure for on-demand broadcasted OSI in accordance with embodiments of the current invention.

FIG. 3B illustrates an exemplary diagram of the time-wise SI delivery procedure for on-demand broadcasted OSI in accordance with embodiments of the current invention. In a modification period 306, MSI 301, 302, 303, and 304 are periodically broadcasted. MSI 305 is broadcasted in the next MP after MP 306. During MP 306, SI change notification 321 is sent. In paging message, the SI change notification indicates the updated OSI, and provide scheduling information for the UE to acquire the updated OSI. In another embodiment, a schedule information for the UE to send SI request is also included. At 322, the UE sends a SI request. In one embodiment, the UE sends a dedicated preamble for the changed OSI to inform gNB of the request for the updated OSI. After detecting the SI dedicated preamble, the gNB could configure the SI window 312 to transmit the updated OSI such as in the start of the next modification period. The exact period of SI window to transmit the updated OSI could be specified in SI change notification. That is, if UE send a SI-dedicated preamble, UE knows that the desired OSI will appear in the time window indicated in its received paging message. If gNB does not detect SI preamble during this modification period, gNB can cancel the SI transmission in the next modification period since no UE wants to update the changed OSI. In yet another embodiment, the SI change notification in the paging message does not specify the time window for SI update transmission, which implicitly indicates that UE should find out the scheduling information by acquiring the minimum SI in the start of the next modification period after UE sends its SI request.

Figure 3C:
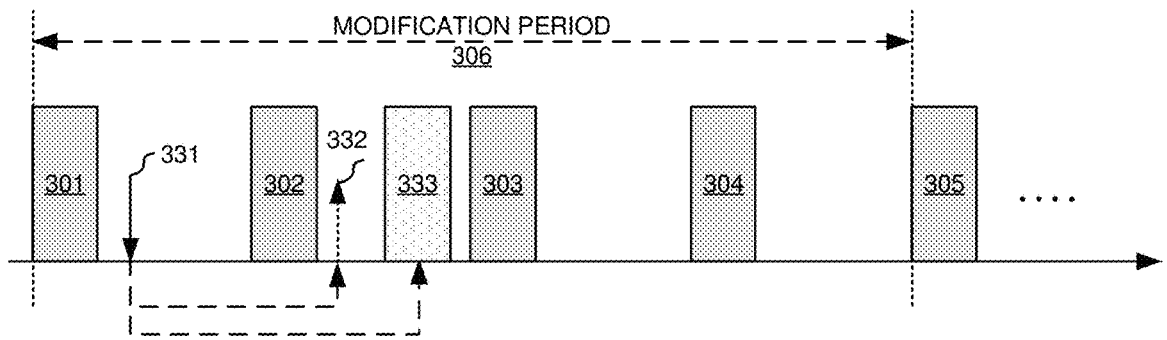
FIG. 3C illustrates an exemplary diagram of the time-wise SI delivery procedure for periodically broadcasted OSI with the updated SI window in the same MP as the SI change notification in accordance with embodiments of the current invention.

FIG. 3C illustrates an exemplary diagram of the time-wise SI delivery procedure for periodically broadcasted OSI with the updated SI window in the same MP as the SI change notification in accordance with embodiments of the current invention. Similar to FIG. 3B, the network indicated the SI update window to the UE. In one embodiment, the network sends SI Change notification 331, which includes the SI update window 333 to be in the same MP 306.

Figure 3D:
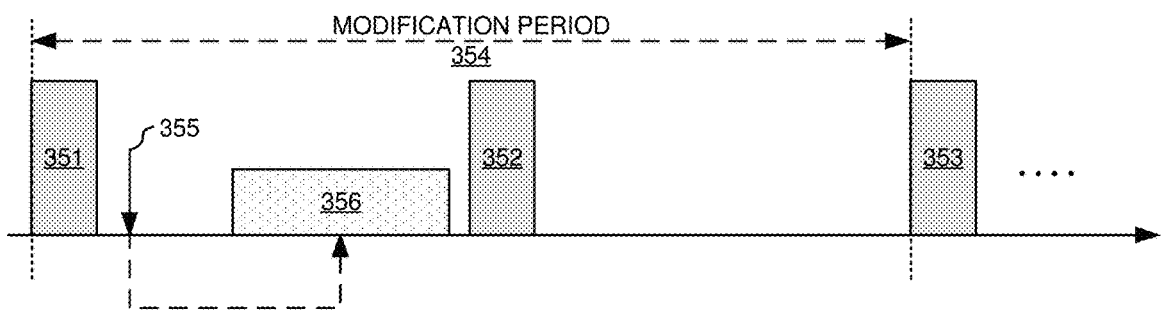
FIG. 3D illustrates an exemplary diagram of the base station proactively scheduling the SI window right after the transmission of the SI change notification in accordance with embodiments of the current invention.

FIG. 3D illustrates an exemplary diagram of the base station proactively scheduling the SI window right after the transmission of the SI change notification in accordance with embodiments of the current invention. MSI 351 and 352 is periodically broadcasted in modification period 354. MSI 353 is periodically broadcasted in the next MP. SI change notification 355 is sent in MP 354. In one embodiment, the exact timing and length of the SI window could be explicitly indicated in SI change notification, or could be pre-configured. If the SI window for broadcast after SI change notification is preconfigured, SI change notification only needs one or a few bits to indicate the existence of SI window. The pre-configured SI window information for the changed SI could be delivered by minimum SI. In one embodiment, the SI update window 356 is indicated in the SI change notification 355.

Figure 3E:
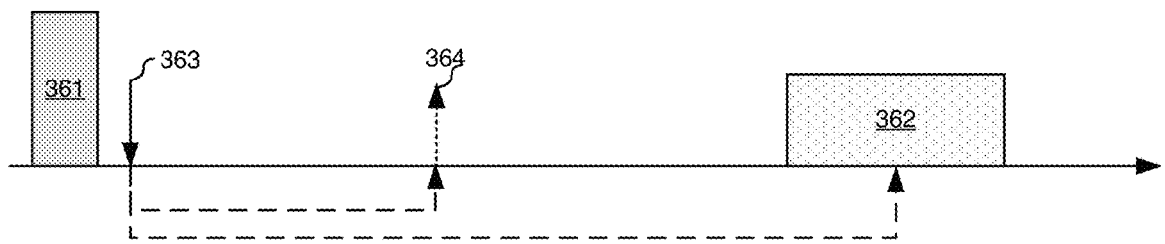
FIG. 3E illustrates an exemplary diagram of the UE shares updated SI transmission by specifying the period for UEs to monitor SI transmission before the UE sends the SI request in accordance with embodiments of the current invention.

FIG. 3E illustrates an exemplary diagram of the UE shares updated SI transmission by specifying the period for UEs to monitor SI transmission before the UE sends the SI request in accordance with embodiments of the current invention. MSI 361 is broadcasted periodically. At 363, the network sends SI change notification. The UE sends SI request 364, and gNB replies the SI request with a SI response in window 362. The gNB could configure the SI transmission window in a broadcasted manner so that multiple UEs could share the SI response and there is no need to create SI request traffic. The information of the dynamically configured broadcast window, such as the timing and length of the time window or the RNTI (radio network temporary identifier) to receive SI, could be explicitly specified in the following SI change notifications or in the following minimum SI. In another embodiment, the gNB could configure a monitoring period for UE to monitor whether the desired SI has been transmitted before UE performs SI acquisition procedure such as on-demand SI request. If UE could acquire the desired updated SI in the monitoring period, the procedure of SI update is terminated. Otherwise, UE perform SI acquisition procedure.

Figure 4:
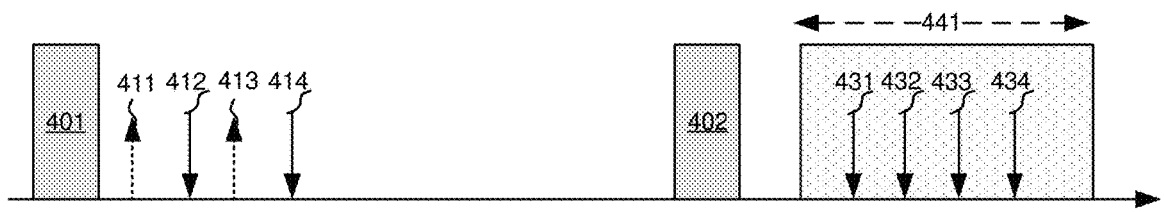
FIG. 4 illustrates an exemplary diagram of switching from on-demand unicast to on-demand broadcast where the broadcast window is scheduled in the start of the next modification period in accordance with embodiments of the current invention.

FIG. 4 illustrates an exemplary diagram of switching from on-demand unicast to on-demand broadcast where the broadcast window is scheduled in the start of the next modification period in accordance with embodiments of the current invention. MSI 401 is periodically broadcasted. When an OSI changes, in paging message SI change notification indicates the changed OSI type and it is delivered by unicast. The UE who needs the updated OSI could immediately trigger on-demand unicasted SI delivery procedure. SI requests 411 and 413 are sent. In one embodiment, SI responses 412 and 414 are sent by the network. If gNB finds that the SI request rate for the changed OSI is above a threshold, gNB schedules a SI window 441, to broadcast the updated OSI 431, 432, 433, and 434 in the start of the next modification period, and turn the deliver method of the changed OSI as broadcast. If UE in DRX mode finds that the updated OSI is delivered by broadcast, they update the OSI until the start of the next modification period. In the first minimum SI of the next modification period, gNB add the information of the on-demand SI window for the updated OSI. The UE then acquires the updated OSI following legacy SI acquisition procedure.

Enhanced On-Demand SI Unicast

In yet another novel aspect, an enhanced on-demand SI unicast procedure is provided. In one embodiment, the two-step SI update request procedure is provided using Msg1 and Msg2 signaling. In another embodiment, a fallback procedure for the on-demand SI unicast is performed.

Figure 5:
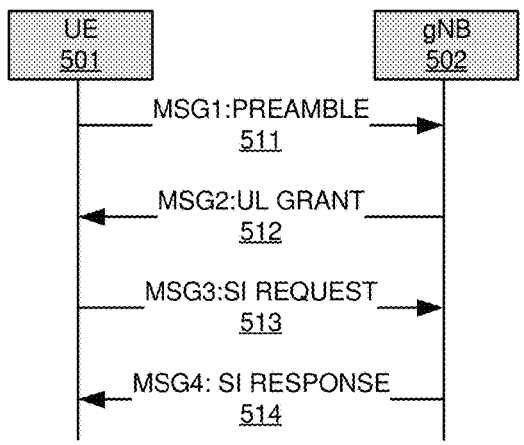
FIG. 5 illustrates an exemplary flow diagram of the on-demand unicast SI delivery using the RACH procedure in accordance with embodiments of the current invention.

FIG. 5 illustrates an exemplary flow diagram of the on-demand unicast SI delivery using the RACH procedure in accordance with embodiments of the current invention. UE 501 communicates with gNB 502. At step 511, UE 501 sends a Msg1 with a preamble. At step 512, gNB 502 sends a Msg2 with UL grant. At step 513, UE 501 sends Msg3 with the SI request. At step 514, gNB 502 sends SI response in Msg4.

Figure 6:
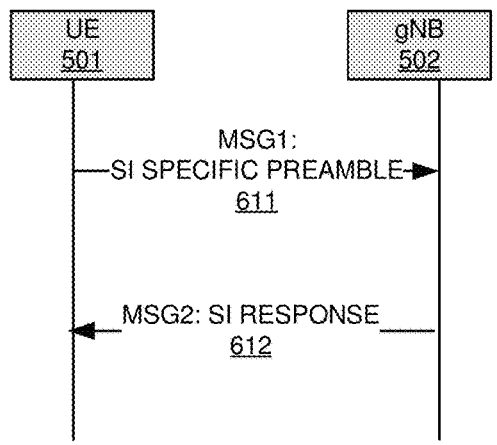
FIG. 6 illustrates an exemplary flow diagram of the on-demand unicast scheme with contention-free request in accordance with embodiments of the current invention.

FIG. 6 illustrates an exemplary flow diagram of the on-demand unicast scheme with contention-free request in accordance with embodiments of the current invention. In one embodiment, each OSI type or OSI group is assigned a dedicated preamble value for Msg1 in the RACH procedure. If there is a one-to-one association between each SI-dedicated preamble and the corresponding OSI type, there is no concern on SI request collision. With the same preamble for Msg1, even when RACH collision occurs, the gNB still has high probability to detect the preamble and thus identifies the requested OSI. It enables the network to support intensive on-demand SI requests. UE 501 communicates with gNB 502. At step 611, UE 501 sends Msg1 with SI specific preamble to gNB 502. gNB 502 has a high probability to decode the Msg1 correctively. At step 612, gNB 502 sends Msg2 with SI response.

When SI update occurs, massive SI requests may be triggered to request the same changed OSI. In one embodiment, the gNB sends the requested SI in the SI response, which is configured that other UEs can receive the same SI response. In one embodiment, the SI response may be transmitted in a broadcast channel, such the BCCH, and scrambled with SI radio network temporary identifier (RNTI). In another embodiment, the SI response is transmitted in CCCH scrambled with random access(RA) RA-RNTI. When the UE wants to update the SI, the UE first monitors the SI transmission to see whether the desired SI has been transmitted in SI response to another UE's SI request. If the UE obtains the SI during the SI monitoring period, the UE will not trigger the on-demand SI request.

In one embodiment, to help the UE find the broadcasted SI transmission window, the gNB provides the information of transmission window in SI change notification. In another embodiment, the gNB configures a time window for the UE to monitor SI transmission before UE start on-demand SI delivery procedure. If UE can find the desired SI in the monitor period, UE need not perform on-demand SI request. The RNTI to acquire the transmitted SI in the SI window could be RA-RNTI or SI-RNTI, which could be provided by the gNB in minimum SI or in SI change notification. In one embodiment, the RNTI are provided explicitly. In another embodiment, the UE blindly tries both RA-RNTI and SI-RNTI for possible SI decoding.

Figure 7:
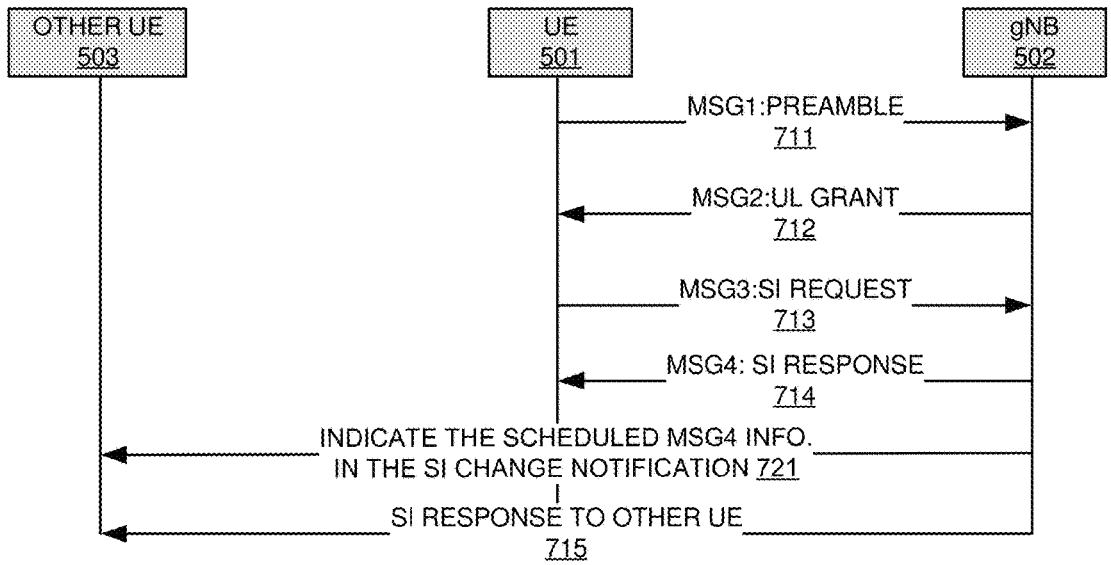
FIG. 7 illustrates an exemplary flow diagram of on-demand unicast with SI response broadcasted for other UE in accordance with embodiments of the current invention.

FIG. 7 illustrates an exemplary flow diagram of on-demand unicast with SI response broadcasted for other UE in accordance with embodiments of the current invention. gNB 502 communicates with an UE 501 and other UE 503. At step 711, UE 501 sends Msg1 with regular preamble to gNB 502. At step 712, gNB 502 sends Msg2 with UL grant to UE 501. At step 713, UE 501 sends Msg3 to gNB 502 with SI request. gNB 502 determines that one or more other UEs may be interested in the same SI update. At step 721, gNB 502 indicates the scheduled Msg4 information in a SI change notification message to other UEs. At step 714, gNB 502 sends SI response in Msg4. At step 715, the SI response is also broadcasted or multi-casted to other UEs by gNB 502.

Figure 8:
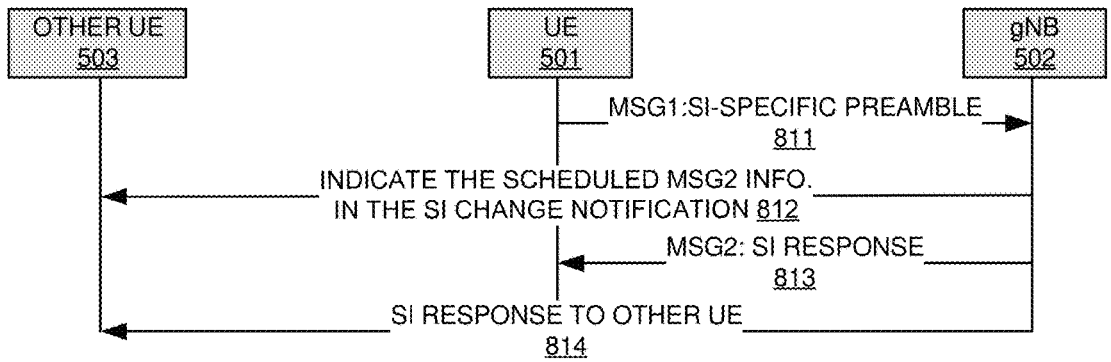
FIG. 8 illustrates an exemplary flow diagram of SI response broadcasted to other UE with SI specific preamble in accordance with embodiments of the current invention.

FIG. 8 illustrates an exemplary flow diagram of SI response broadcasted to other UE with SI specific preamble in accordance with embodiments of the current invention. gNB 502 communicates with an UE 501 and other UE 503. At step 811, UE 501 sends Msg1 with SI specific preamble to gNB 502. gNB 502 determines that one or more other UEs may be interested in the same SI update. At step 812, gNB 502 indicates the scheduled Msg2 information in a SI change notification message to other UEs. At step 813, gNB 502 sends Msg2 with SI response to UE 501. At step 814, the SI response is also broadcasted or multi-casted to other UEs by gNB 502.

Figure 9:
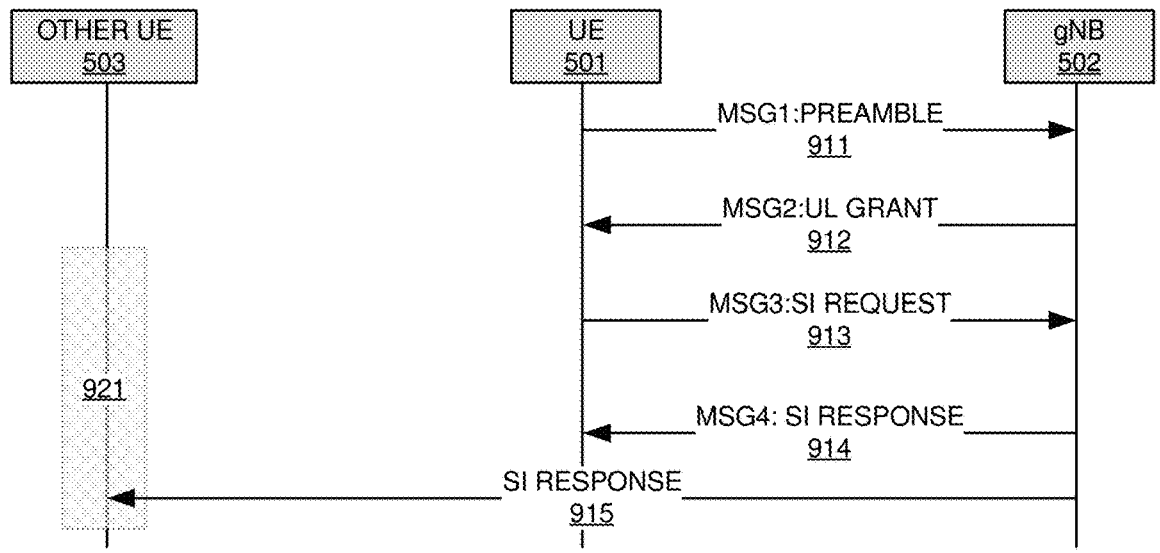
FIG. 9 illustrates an exemplary flow diagram of the SI response broadcasted to other UEs and the UEs monitor possible SI transmission before initiating on-demand SI request in accordance with embodiments of the current invention.

FIG. 9 illustrates an exemplary flow diagram of the SI response broadcasted to other UEs and the UEs monitor possible SI transmission before initiating on-demand SI request in accordance with embodiments of the current invention. gNB 502 communicates with an UE 501 and other UE 503. At step 911, UE 501 sends Msg1 with regular preamble to gNB 502. At step 912, gNB 502 sends Msg2 with UL grant to UE 501. At step 913, UE 501 sends Msg3 to gNB 502 with SI request. At step 914, gNB 502 sends SI response in Msg4. gNB 502 determines that one or more other UEs may be interested in the same SI update. At step 915, the SI response is also broadcasted or multi-casted to other UEs by gNB 502. In one embodiments, other UEs monitors a period of time in monitor time window 921 when the UEs determines to request SI updates. During monitor window 921 if the UE detects the SI response, the UE does not need to trigger the on-demand SI request procedure.

In another embodiment, the SI request is sent along with the preamble to be transmitted in Msg1. Once gNB decodes the received Msg1, gNB knows what SI is requested and can send the requested SI in Msg2. Compared to legacy RACH procedure, SI acquisition latency is reduced because the round-trip time for Msg3 and Msg4 transmission is saved. If gNB detects the preamble but cannot decode the appended SI request in Msg1, gNB can fallback to legacy RACH procedure and send Msg2. When UE receives the Msg2 but find no requested SI in Msg2, UE knows that gNB does not get the information of requested SI. UE can then proceed to legacy RACH procedure and send SI request in Msg3, as legacy RACH procedure does.

In yet another embodiment, if the gNB failed to successfully decodes the SI request in the Msg1, the UE falls back to the four-step SI request procedure and send a SI request along with Msg3 to the gNB using the resource assigned in the Msg2.

Figure 10A:
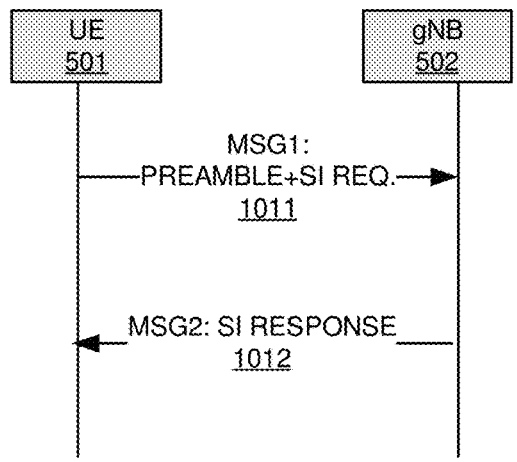
FIG. 10A illustrates an exemplary flow diagram of sending the SI request along with the preamble in Msg1 in accordance with embodiments of the current invention.

FIG. 10A illustrates an exemplary flow diagram of sending the SI request along with the preamble in Msg1 in accordance with embodiments of the current invention. UE 501 communicates with gNB 502. At step 1011, UE 501 sends Msg1 with regular preamble along with the SI request. gNB 502 decodes the SI request correctly. At step 1012, gNB 502 sends Msg2 along with the SI response to UE 501.

Figure 10B:
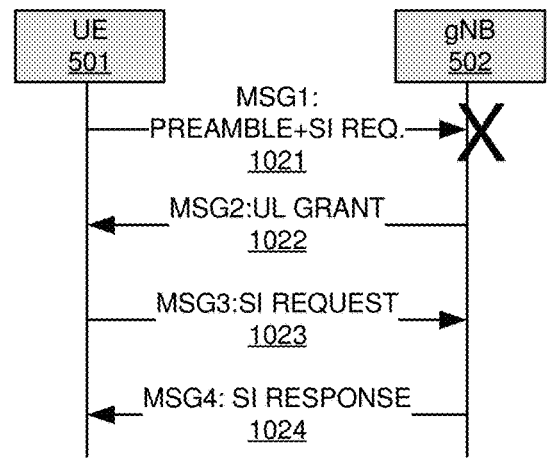
FIG. 10B illustrates an exemplary flow diagram of sending the SI request along with the preamble in Msg1 and falling back to the four-step SI request procedure when the gNB failed to decode the SI request in accordance with embodiments of the current invention.

FIG. 10B illustrates an exemplary flow diagram of sending the SI request along with the preamble in Msg1 and falling back to the four-step SI request procedure when the gNB failed to decode the SI request in accordance with embodiments of the current invention. UE 501 communicates with gNB 502. At step 1021, UE 501 sends Msg1 with regular preamble along with the SI request. gNB 502 failed to decode the SI request correctly. At step 1022, gNB 502 sends Msg2 with UL grant to UE 501. UE 501 falls back the four-step SI request and sends SI request in Msg3 at step 1023. At step 1024, gNB 502 sends the SI response with Msg4.

In one embodiment, the gNB reserves a dedicated preamble, an SI preamble, for the UE to request SI. When the gNB detects the SI preamble, the gNB determines it is an SI update request. Although the gNB does not know which SI is being requested, the gNB transmits some SI update in Msg2. In one embodiment, the gNB determines which SI to be sent based on the SI status and other factors. In one embodiment, the transmitted one or more SIs are recently updated, are different form the neighboring cell, or are frequently requested at that moment. When the UE receives Msg2, the UE checks whether the desired SI is updated in Msg2. If the UE receives the SI desired, the on-demand SI delivery procedure is terminated; otherwise, the UE sends SI request in Msg3 to request the specific SI.

Figure 11A:
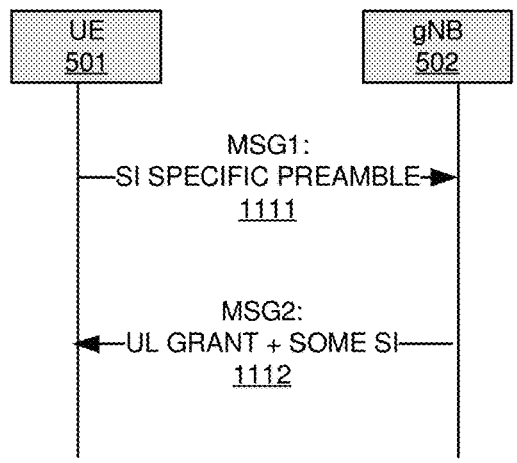
FIG. 11A illustrates an exemplary flow diagram of a on-demand unicast request with a dedicated SI-preamble and the UE receives the desired SI in Msg2 in accordance with embodiments of the current invention.

FIG. 11A illustrates an exemplary flow diagram of an on-demand unicast request with a dedicated SI-preamble and the UE receives the desired SI in Msg2 in accordance with embodiments of the current invention. UE 501 communicates gNB 502. At step 1101 UE 501 sends a Msg1 to gNB 502 with a dedicated preamble, which indicates a SI update request. The SI preamble does not specify which SI the UE is requesting. gNB 502 upon receiving the Msg1 with the reserved SI preamble, determines one or more SI updates to be sent to UE 501. The selected one or more SI is based on one or more conditions including the SIs being recently updated, different form the neighboring cell, and frequently requested at that moment. At step 1102, gNB 502 sends the selected one or more SI updates with the SI response to UE 502 in Msg2 together with the UL grant. UE 502 upon receiving the SI response and determines the desired one more SIs are included, the UE terminates the on-demand SI update request procedure.

Figure 11B:
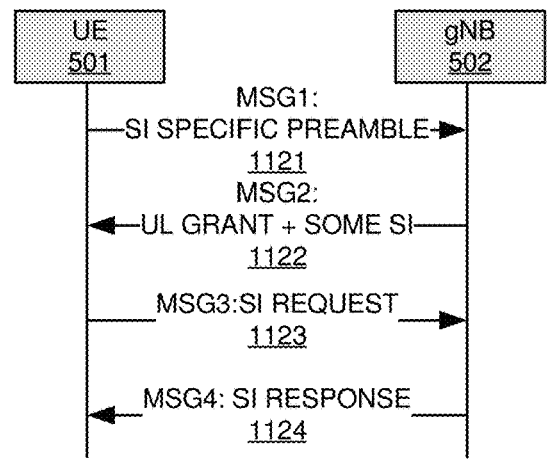
FIG. 11B illustrates an exemplary flow diagram of a on-demand unicast request with a dedicated SI-preamble and the UE does not receive the desired SI in Msg2 in accordance with embodiments of the current invention.

FIG. 11B illustrates an exemplary flow diagram of an on-demand unicast request with a dedicated SI-preamble and the UE does not receive the desired SI in Msg2 in accordance with embodiments of the current invention. UE 501 communicates gNB 502. At step 1111 UE 501 sends a Msg1 to gNB 502 with a dedicated preamble, which indicates a SI update request. The SI preamble does not specify which SI the UE is requesting. gNB 502 upon receiving the Msg1 with the reserved SI preamble, determines one or more SI updates to be sent to UE 501. At step 1112, gNB 502 sends the selected one or more SI updates with the SI response to UE 502 in Msg2 together with the UL grant. UE 501 upon receiving the SI response and determines the desired one more SIs are not included. At step 1113, UE 501 sends the SI request in Msg3 to gNB 502. At step 1114, gNB 502 sends the SI response in Msg4.

Figure 12:
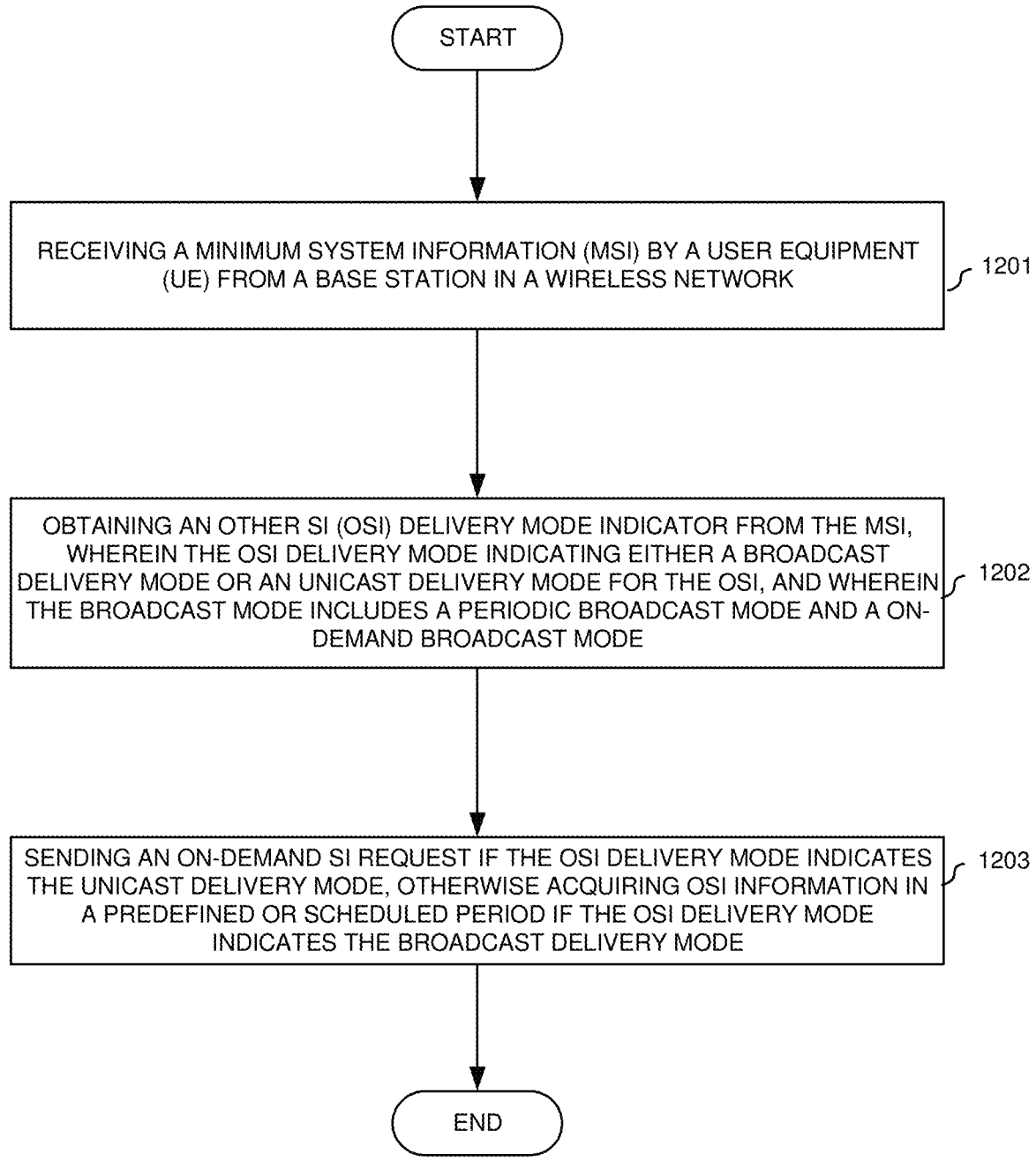
FIG. 12 illustrates an exemplary message flow chat of the UE performing the on-demand SI update procedure in accordance with embodiments of the current invention.

FIG. 12 illustrates an exemplary message flow chat of the UE performing the on-demand SI update procedure in accordance with embodiments of the current invention. At step 1201, the UE receives a minimum system information (MSI) from a base station in a wireless network. At step 1202, the UE obtains an OSI delivery mode indicator from the MSI, wherein the OSI delivery mode indicating either a broadcast delivery mode or an unicast delivery mode for the OSI, and wherein the broadcast mode includes a periodic broadcast mode and an on-demand broadcast mode. At step 1203, the UE sends an on-demand SI request if the OSI delivery mode indicates the unicast delivery mode, otherwise acquires OSI information in a predefined or scheduled period if the OSI delivery mode indicates the broadcast delivery mode.

Figure 13:
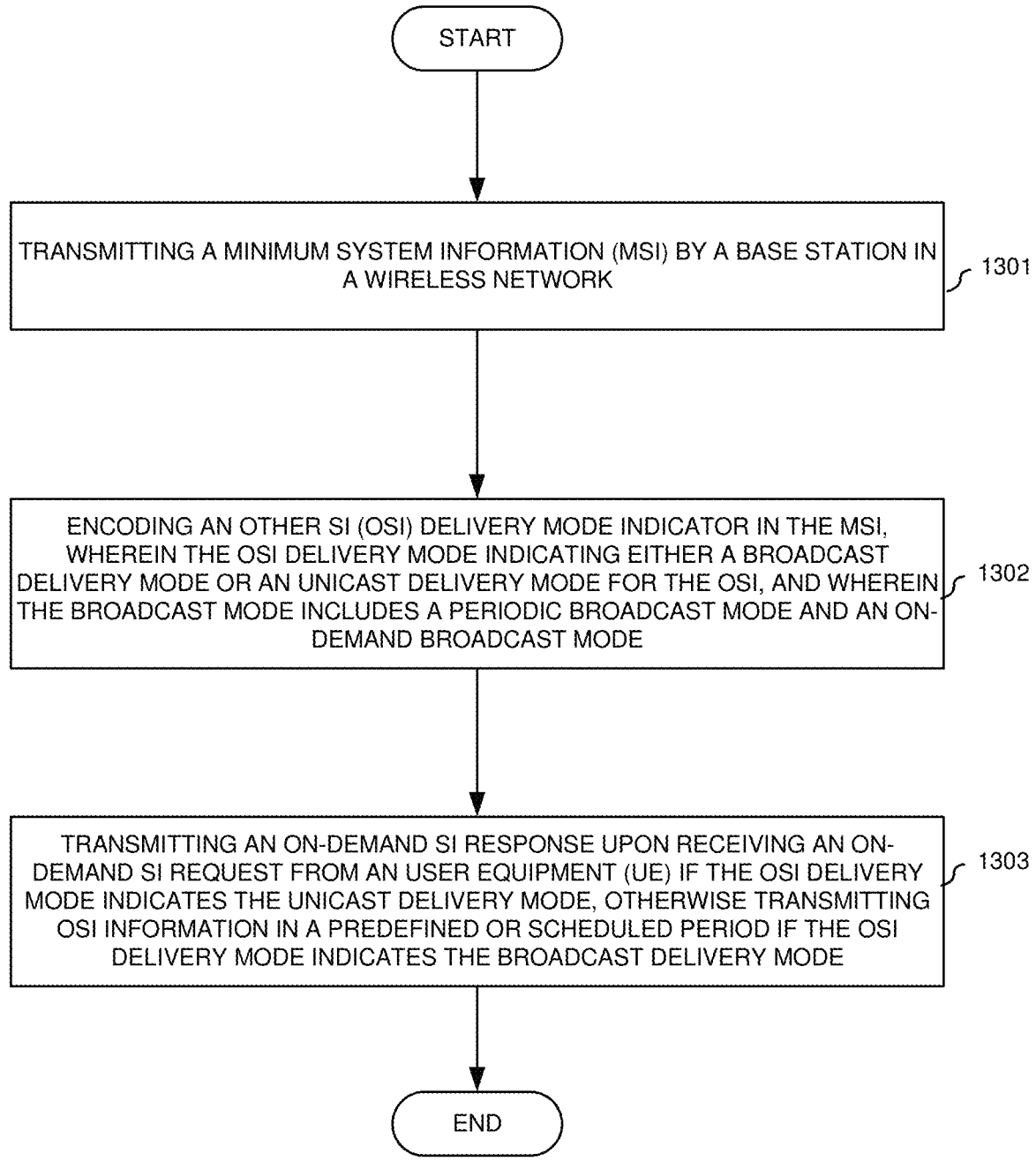
FIG. 13 illustrates an exemplary message flow chat of the base station performing the on-demand SI update procedure in accordance with embodiments of the current invention.

FIG. 13 illustrates an exemplary message flow chat of the base station performing the on-demand SI update procedure in accordance with embodiments of the current invention. At step 1301, the base station transmits a minimum system information (MSI) in a wireless network. At step 1302, the base station encodes an OSI delivery mode indicator in the MSI, wherein the OSI delivery mode indicating either a broadcast delivery mode or an unicast delivery mode for the OSI, and wherein the broadcast mode includes a periodic broadcast mode and an on-demand broadcast mode. At step 1303, the base station transmits an on-demand SI response upon receiving an on-demand SI request from a user equipment (UE) if the OSI delivery mode indicates the unicast delivery mode, otherwise transmits OSI information in a predefined or scheduled period if the OSI delivery mode indicates the broadcast delivery mode.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising: receiving a System Information (SI) change: notification message and a minimum system information (MSI) by a user equipment (UE) from a base station in a wireless network; obtaining an other SI (OSI) delivery mode indicator from the MSI, wherein the OSI delivery mode indicator indicating either a periodic broadcast delivery mode or an on-demand delivery mode for each OSI, wherein the on-demand delivery mode includes an on-demand unicast delivery mode and an on-demand broadcast delivery mode; sending an on-demand SI request for a set of requested OS in response to the OSI delivery mode indicating the on-demand delivery mode, wherein the UE sends the on-demand SI request using a radio resource when configured by the SI change notification message, and wherein the UE receives a first SI response that includes a first subset of requested OSI via the on-demand unicast delivery mode, and receives a second SI response that includes a second subset of requested OSI via the on-demand broadcast delivery mode; and acquiring OS information in a predefined or scheduled period in response to the OSI delivery mode indicating the periodic broadcast delivery mode for each requested OSI.

2. The method of claim 1, wherein the OSI delivery mode is broadcast and upon receiving an SI change notification message the UE acquires updated system information in a start of a next modification period.

3. The method of claim 1, wherein the OSI delivery mode is broadcast and SI delivery schedule information is included in a SI change notification message.

4. The method of claim 1, wherein the SI request message is sent in a Msg1 of a random-access channel (RACH) procedure by the UE.

5. The method of claim 4, wherein a preamble is selected for the Msg1 to match a requested SI or an SI group such that the base station would decode the preamble and transmit one or more requested SI in Msg2.

6. The method of claim 4, wherein a SI request message is included in the Msg1 together with a preamble.

7. The method of claim 6, wherein a SI response is included in a Msg2 if the base station successfully received the SI request message included in the Msg1, otherwise an uplink grant is included in a Msg2 such that a SI request is sent by the UE based on the uplink grant in a Msg3.

8. The method of claim 4, wherein an SI response in response to the SI request is broadcasted or multi-casted.

9. A method comprising: transmitting a System Information (SI) change notification message and a minimum system information (MSI) by a base station in a wireless network; encoding an other SI (OSI) delivery mode indicator in the MSI, wherein the OSI delivery mode indicator indicating either a periodic broadcast delivery mode or an on-demand delivery mode for each OSI, wherein the on-demand delivery mode includes an on-demand unicast delivery mode and an on-demand broadcast delivery mode; transmitting multiple on-demand SI responses upon receiving an on-demand SI request for a set of requested OSI from a user equipment (UE) in response to the OSI delivery mode indicating the on-demand delivery mode, wherein the on-demand SI request is received using a radio resource when configured by the SI change notification message, and wherein a first OSI response that includes a first subset of the requested OSI is transmitted via the on-demand unicast delivery mode, and a second OSI response that includes a second subset of the requested OSI is transmitted via the on-demand broadcast delivery mode; and transmitting OSI information in a predefined or scheduled period in response to the OSI delivery mode indicating the periodic broadcast delivery mode for each requested OSI.

10. The method of claim 9, wherein the OSI delivery mode is broadcast and sending updated system information in a start of a next modification period after sending an SI change notification message.

11. The method of claim 9, wherein the OSI delivery mode is broadcast and SI delivery schedule information is included in a SI change notification message.

12. A user equipment (UE), comprising: a transceiver that transmits and receives radio frequency (RF) signals from one or more base stations (BS) in a wireless network; a minimum system information (MSI) receiver that receives a System Information (SI) change notification message and MSI from a base station; an other SI (OSI) indicator decoder that obtains an OSI delivery mode indicator from the MSI, wherein the OSI delivery mode indicator indicating either a periodic broadcast delivery mode or an on-demand delivery mode for each OSI, wherein the on-demand delivery mode includes an on-demand unicast delivery mode and an on-demand broadcast delivery mode; and an SI update acquiring circuit that sends an on-demand SI request for a set of requested OSI in response to the OSI delivery mode indicating the on-demand delivery mode, and wherein the UE sends the on-demand SI request using a radio resource when configured by the SI change notification message, and wherein the UE receives a first SI response that includes a first subset of requested OSI via the on-demand unicast delivery mode, and receives a second SI response that includes a second subset of requested OSI via the on-demand broadcast delivery mode, and the UE acquires OSI information in a predefined or scheduled period in response to the OSI delivery mode indicating the periodic broadcast delivery mode for each requested OSI.

13. The UE of claim 12, wherein the OS delivery mode is broadcast and upon receiving an SI change notification message the UE acquires updated system information in a start of a next modification period.

14. The UE of claim 12, wherein the OSI delivery mode is broadcast and SI delivery schedule information is included in a SI change notification message.

15. The UE of claim 12, wherein the SI request message is sent in a Msg1 of a random-access channel (RACH) procedure by the UE.

16. The UE of claim 15, wherein a preamble is selected for the Msg1 to match a requested SI or an SI group such that the base station would decode the preamble and transmit one or more requested SI in Msg2.

17. The UE of claim 15, wherein a SI request message is included in the Msg1 together with a preamble.

18. The UE of claim 17, wherein a SI response is included in a Msg2 if the base station successfully received the SI request message included in the Msg1 otherwise an uplink grant is included in a Msg2 such that a SI request is sent by the UE based on the uplink grant in a Msg3.

19. The UE of claim 15, wherein an SI response in response to the SI request is broadcasted or multi-casted.

* * * * *